United States Patent Office 3,418,796
Patented Dec. 31, 1968

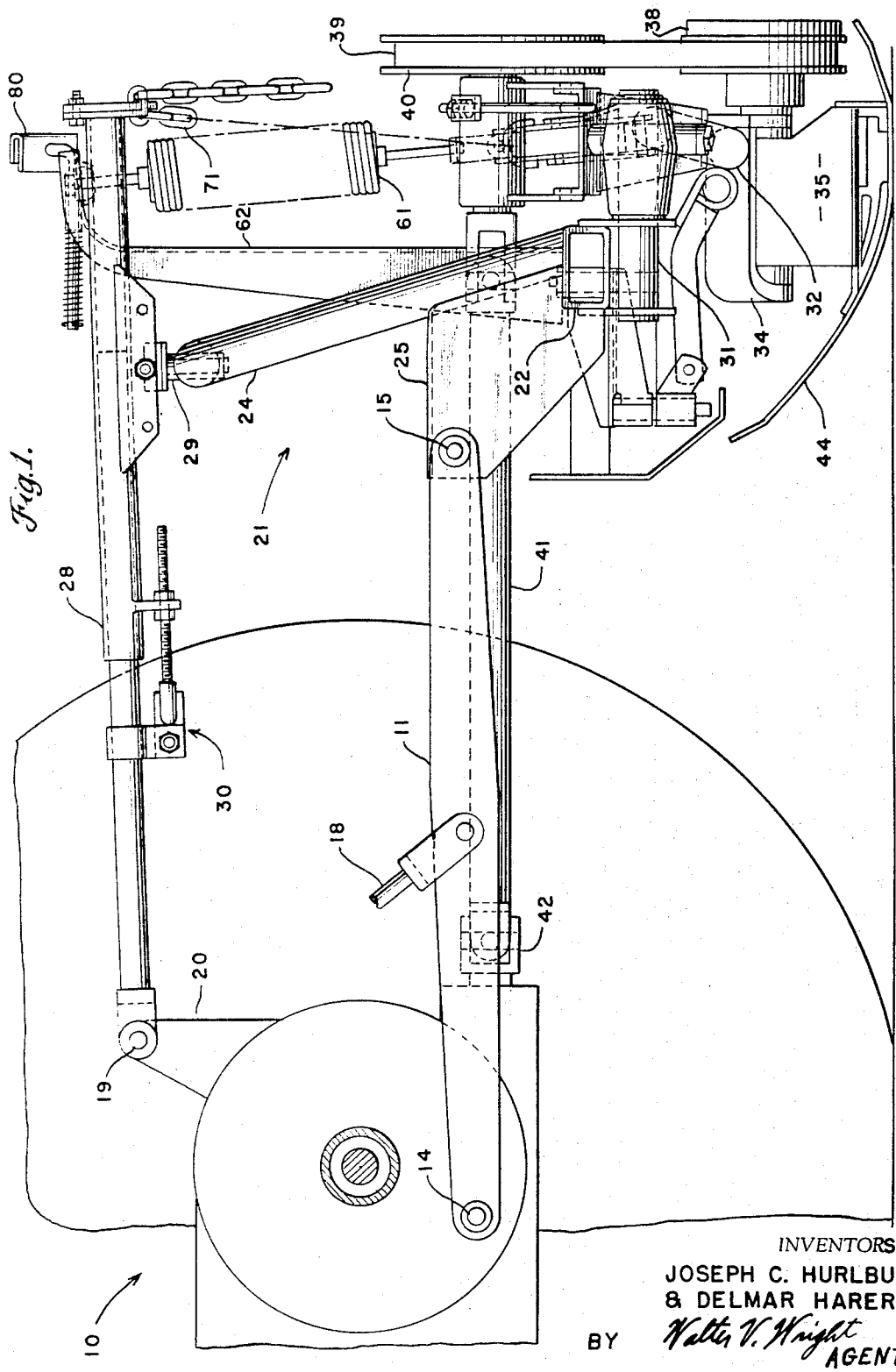

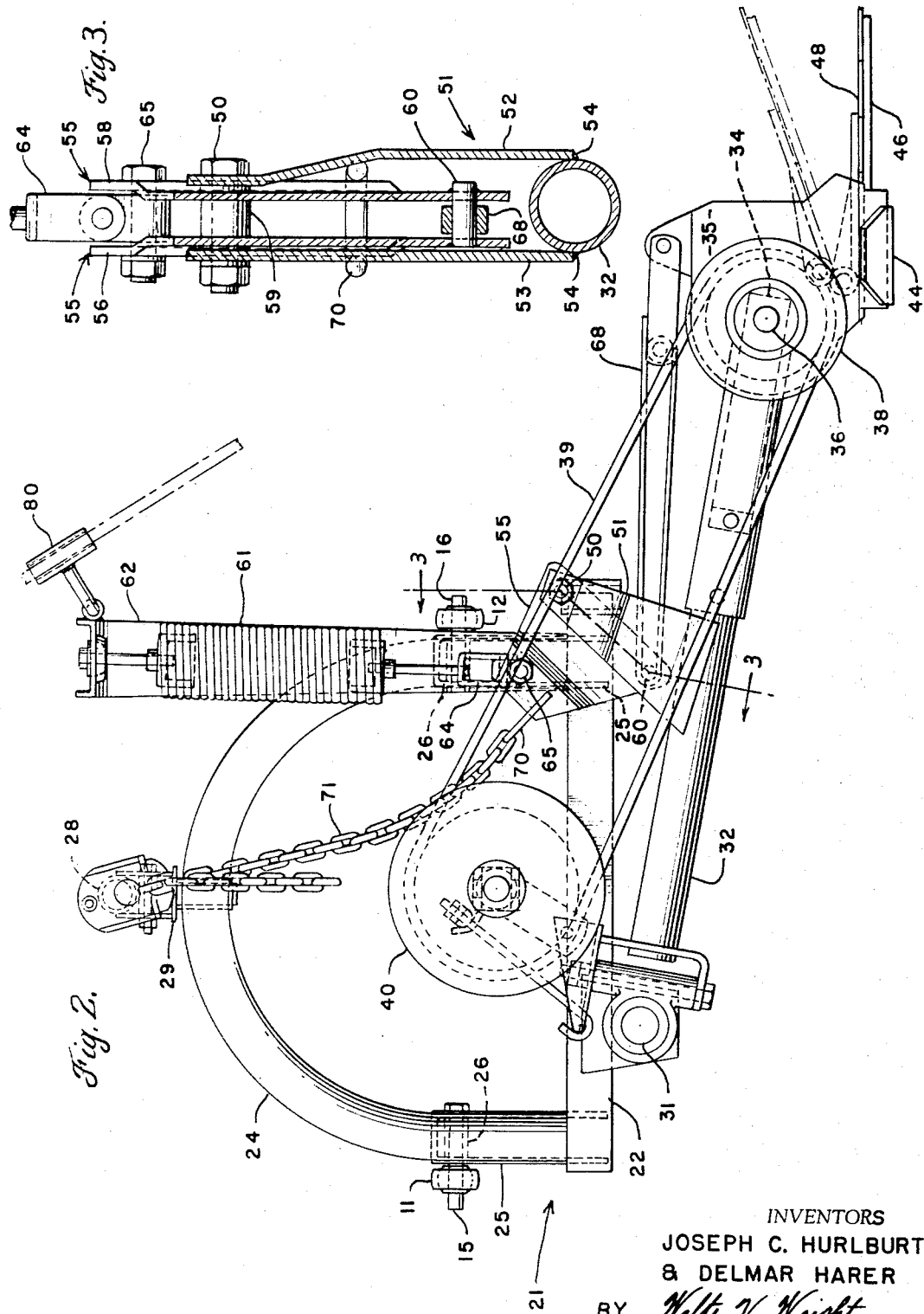

3,418,796
MOWER
Joseph C. Hurlburt, Leola, and Delmar Harer, New Holland, Pa., assignors to Sperry Rand Corporation, New Holland, Pa., a corporation of Delaware
Filed Dec. 7, 1965, Ser. No. 512,166
4 Claims. (Cl. 56—25)

ABSTRACT OF THE DISCLOSURE

A mower drag bar supporting and lifting and cutter bar gagging mechanism having a single control member which is freely movable to eliminate unbalanced forces and which is quickly operable to raise the cutter bar over foreign objects during the operation thereof.

---

This invention relates generally to mowers. More specifically, it relates to mechanism for supporting or "floating" a mower drag bar and cutter bar and for moving these elements between lowered operative positions and raised inoperative, or transport, positions.

Agricultural mowers have a base frame which mounts behind a tractor. A bar, known as a drag bar, has one end pivotally mounted on the base frame. The drag bar extends laterally from its pivotally supported end to a free end disposed laterally of the tractor. A cutter bar has one end pivotally mounted on the free end of the drag bar and extends laterally outwardly from its pivotally mounted end. In this manner, the entire cutter bar is disposed to one side of the tractor to mow a swath alongside and parallel to the path of travel of the tractor.

The mower cutter bar has ground shoes, or runners, on each of its ends which ride over the ground and gage the height of the cut above the ground. In operation, the ground shoes should float along the ground in a manner that enables them to ride over high spots and dip into low spots without digging into the ground. This requirement demands that there be some weight on each of the ground shoes during operation; but only a fraction of the total weight of the cutter bar and drag bar which acts downwardly about the pivotally mounted end of the drag bar. Springs are commonly employed to counter-balance a portion of the weight of the drag bar and cutter bar and regulate the operating weight of the ground shoes. The constant effective, or operating, weight at the ground shoes is designed into the machine and is always in effect when the cutter bar and drag bar are in their operative positions. The present invention deals largely with the balancing of forces in the area of the mower drag bar and cutter bar. For simplification, the constant operating weight of the cutter bar ground shoes will be hereafter ignored. It is to be understaood, however, that these constant ground shoe forces are present when a mower cutter bar is adjusted for proper floating action.

It is customary to provide mechanism for swinging a mower drag bar upwardly from its operative position to a raised inoperative, or transport, position. While this would raise the cutter bar carried thereby, it affords a cutter bar lifting action which is too slow for many situations. Consequently, most mowers are provided with cutter bar gagging mechanism. In response to actuation of the lifting mechanism, the gagging mechanism causes the cutter bar to swing rapidly upwardly about its pivotal connection to the free end of the drag bar before the drag bar begins to raise. The extent of the cutter bar gagging motion is usually less than thirty degrees. It enables the operator to quickly raise the cutter bar over foreign objects which may not be seen by the operator until he is very close to them, for example.

To accomplish cutter bar gagging, conventional mowers connect the lifting mechanism to the cuuter bar. When the lifting mechanism is actuated, it first swings the cutter bar to its gagged position at which position a stop member engages the drag bar and positively binds, or stops, the cutter bar from pivoting any further relative to the drag bar. Continued application of force by the lifting mechanism then causes the entire drag bar to swing upwardly about its pivotally mounted end. This type of gagging mechanism subjects various elements of the drag bar-cutter bar assembly and the lifting mechanism to undue stress and unfavorable leverage requiring the use of heavy, expensive parts if excessive wear and maintenance is to be avoided.

It is an object of this invention to provide a mower drag bar supporting and lifting and cutter bar gagging mechanism which is free of all positive or binding stop members.

It is another object of this invention to provide mower drag bar supporting and lifting and cutter bar gagging mechanism wherein the structural elements, in operation, are free of the internal and binding stress imposed upon the elements of conventional mechanisms by motion limiting stops and the like, thereby enabling the use of fewer and lighter elements with the accompanying reduction in manufacturing cost.

It is another object of this invention to provide mower drag bar supporting and lifting and cutter bar gagging mechanism wherein the operating forces of the drag bar and cutter bar elements all act upon a single control member which is freely movable to eliminate unbalanced forces.

These and other objects and advantages of this invention will be apparent upon reference to the following description and claims taken in conjunction with the accompanying drawings wherein:

FIG. 1 is a side elevational view of a tractor mounted mower having cutter bar and drag bar control mechanism constructed in accordance with the principles of the present invention;

FIG. 2 is a rear elevational view of the mechanism shown in FIG. 1; and

FIG. 3 is a sectional view taken on the line 3—3 of FIG. 2.

Referring now to the drawings in detail, particularly FIG. 1, the reference numeral 10 refers, generally, to the rear portion of a farm tractor of the type equipped with a three point implement hitch. The three point implement hitch consists of left and right rearwardly extending drawbars 11 and 12, respectively, (see FIG. 2) which are pivotally mounted on opposite sides of the tractor axle housing for vertical swinging movement about the horizontal transverse axis of pivot members 14 carried by the axle housing. The rearmost ends of the drawbars 11 and 12 carry pivotal mounting members 15 and 16, respectively, which constitute two of the hitch points of a three point implement hitch. The drawbars 11 and 12 are vertically swingable under the control of the tractor hydraulic system which is connected to the drawbars by lift links. One lift link is partially shown in FIG. 1 and indicated by the reference numeral 18. The third hitch point consists of a pivot member 19 fixedly carried on the tractor body by a stanchion 20 which is provided on the upper rear portion of the tractor body midway between the drawbars 11 and 12. This mechanism is well known in the tractor art.

The reference numeral 21 indicates, generally, a mower mounting base frame. The base frame consists mainly of a horizontal transverse main frame beam 22 and an inverted U-shaped mast 24 whose ends are respectively fixedly attached to the main frame beam 22 adjacent the opposite ends thereof. Heavy gusset-like members 25 project forwardly from the mast and main frame beam to strengthen the jointure of these two members. The gussets 25 also provide mounting sockets 26 (FIG. 2) by which the main frame is mounted on the hitch members 15 and 16 carried by the drawbars 11 and 12.

An upper stabilizer arm 28 is connected to, and carried by, the mast 24 at the top central portion of the mast. The stabilizer arm 28 is attached to mast 24 by a dual-axis pivot device 29. The pivot device 29 provides for both vertical and horizontal pivoting movement of stabilizer arm 28 relative to the mower base frame mast while preventing relative movement between the stabilizer arm and mast in the fore-and-aft direction. The stabilizer arm is telescopically adjustable by mechanism indicated by the reference numeral 30 to adapt the mower base frame for connection to tractors whose drawbar length and geometry differs from that of the illustrated tractor. It will be noted in FIG. 1 that the upper stabilizer arm 28 projects rearwardly beyond mast 24 and main base frame beam 22.

In operation, the mower base frame may be raised and lowered by the tractor operator by actuating the hydraulic system of the tractor to swing the drawbars upwardly via lift links 18. The stabilizer arm 28 prevents fore-and-aft tipping of the mower base frame about the hitch members 15 and 16. It will be obvious from FIG. 1, that as the mower base frame is carried upwardly by the drawbars, the rearmost end of upper stabilizer arm 28 will rise relative to the ground at a faster rate than the mower base frame.

A pintle 31 is fixedly carried by main base frame beam 22 on the underside thereof. The pintle projects horizontally rearwardly from base frame beam 22. A mower drag bar 32 is journalled on pintle 31 for vertical swinging movement about the axis of the pintle. The normal operating position of drag bar 32 is shown in FIG. 2. In this figure it will be seen that the drag bar extends downwardly and laterally from pintle 31. The pivotal connection of the drag bar to pintle 31 enables the drag bar to be swung vertically from the position shown in FIG. 2 to a raised transport, or inoperative, position wherein the drag bar extends generally horizontally from pintle 31. These two drag bar positions are generally conventional in the mower art. The drag bar 32 has a forked outer, or free, end 34 which is best seen in FIG. 1. A mower driving head 35 is pivotally mounted on the forked end 34 of the drag bar. The axis about which the mower driving head 35 pivots relative to the drag bar is coaxial with the axis of the shaft 36 (FIG. 2) of the mower driving head pulley 38. This will be apparent from a comparison of FIGS. 1 and 2.

The mower drive pulley 38 is driven by a V-belt 39 from a main drive pulley 40 supported on the assembly which mounts drag bar 32 on pintle 31. An extension shaft 41 (FIG. 1) extends forwardly from pulley 40 to the power-takeoff shaft 42 of the tractor, as is well known in the art. A ground shoe or runner 44 is fixedly carried by the mower driving head 35. The usual mower cutter bar 46 (FIG. 2) and reciprocating knife bar 48 project laterally outwardly from the mower driving head 35 and ground shoe 44. As is well known in the art, the mower driving head 35 drives the knife bar 48 in horizontal reciprocation along the upper surface of mower cutter bar 46 to provide the crop cutting action. The horizontal pivot axis about which the mower driving head is connected to drag bar 32, enables the mower driving head, and therefore the cutter bar, to swing upwardly to a "gagged" position relative to drag bar 32. This position is shown in phantom lines in FIG. 2.

Referring now primarily to FIGS. 2 and 3, a pivot bolt 50 is fixedly carried by a stanchion 51 on drag bar 32. In FIG. 3 it may be seen that stanchion 51 consists of a pair of generally vertical plates 52 and 53 which are welded to drag bar 32 as indicated at 54 in FIG. 3 and project upwardly therefrom generally parallel to each other. A control member 55 is journalled on pivot bolt 50. Referring again to FIG. 3, it may be seen that the control member 55 is actually a pair of plates 56 and 58 which are fixed relative to each other by a spacer sleeve 59 carried on pivot bolt 50 and by a pivot pin 60 which passes through the plate 56 and 58 and is welded thereto. The particular parallel plate type of construction of stanchion 51 and control member 55 is merely one convenient manner of constructing these members. Hereafter, reference will be made merely to stanchion 51 and control member 55.

It will be apparent in FIG. 2 from the size and shape of control member 55, that this member, if free of the other members connected thereto, would be freely rotatable about the axis of pivot bolt 50 through a considerable angular range of movement. It is an important feature of the present invention that no fixed stop members engage and limit the pivotal movement of control member 55 about pivot bolt 50. In FIG. 2 it may be observed that if control member 55 were rotated counter clockwise about bolt 50 through an angle of approximately ninety degrees, the control plate would engage drag bar 32. However, in operation, the control member 55 does not rotate counter clockwise significantly beyond the position in which it is shown in FIG. 2. Therefore, engagement of the control member with drag bar 32 does not occur.

In FIGS. 1 and 2 it will be seen that a spring 61 has its upper end anchored in a stanchion 62 which is carried by main frame beam 22. A swivel type bracket 64 (see FIG. 3) connects the lower end of spring 61 to control member 55 for pivotal movement about a bolt 65 which passes through, and is carried by control member 55 at a predetermined point on the control member. One purpose of spring 61 is to counter-balance the weight of the drag bar, and cutter bar which acts downwardly about the drag bar mounting pintle 31. This enables the mower ground shoe 44 (and a similar shoe not shown on the outer end of cutter bar 46) to float along the ground when the mower is in operation. It will be apparent in FIG. 2 that with the weight of the drag bar, the mower driving head and the cutter bar, as well as the other elements carried by the drag bar, being known for a given mower, the upward force that must be supplied by spring 61 to counter-balance the total weight on the drag bar is known. It will also be apparent, that knowing the weight of the cutter bar and mower driving head for any given mower, the downward force of these elements acting about the pivot axis 36 between the mower driving head and the drag bar is also known. In FIG. 2 it will be seen that linkage 68 is pivotally interconnected between the mower driving head 35 and the pivot pin 60 on control member 55. In accordance with the present invention, the required spring 61 (with the mower drag bar and cutter bar in their normal operative positions) will exert a clockwise turning moment on control member 55 relative to pivot bolt 50. The magnitude of this moment is known since the spring force and the distance between bolts 65 and 50 are both known. The pivot pin 60 which connects linkage 68 to control member 55 is located relative to pivot bolt 50 so that the cutter bar supporting force acting through linkage 68 and pivot pin 60 exerts a counter clockwise turning moment on control member 55 about pivot bolt 50 which counter-balances the clockwise turning moment of spring 61 on control member 55 when the drag bar and cutter bar are in their normal operative positions. In this manner, both the cutter bar and drag bar are floatingly supported without any fixed stops in their normal operative positions by the counter-balancing moments applied to control member 55 by spring 61 and linkage 68.

Control member 55 also carries, at a predetermined location, a U-shaped connection link 70. In FIG. 2 it may be seen that a chain 71 has one end connected to the U-shaped connecting member 70 and the other end anchored to the rear terminal end of upper stabilizer arm 28. With the mower drag bar and cutter bar in their normal operating positions as shown in FIG. 2, chain 71 hangs slack between stabilizer arm 28 and the U-shaped connecting member 70. As mentioned earlier, when the operator raises the drawbars 11 and 12, the rear terminal end of stabilizer arm 28 moves upwardly at a faster rate than the mower base frame. This action rapidly causes chain 71 to draw tight between the stabilizer arm and the connecting member 70 following which the force applied to connecting member 70 by chain 71 causes control member 55 to swing clockwise about pivot bolt 50. This occurs because the line of application of the force of chain 71 on control member 50 passes below pivot bolt 50 and exerts a new and additional clockwise turning moment on the control member. This pivoting action on control member 55 causes the cutter bar 46 to swing upwardly to its gagged position because the pivot pin 60 and linkage 68 are pulled to the left and upwardly from the position shown in FIG. 2. This promptly relaxes spring 61 and reduces the force exerted on control member 55 by the spring to zero. It will be apparent in FIG. 2 that clockwise movement of control member 55 under the influence of chain 71 rapidly moves connection link 70 upwardly so that its position approaches a straight line between pivot bolt 50 and the upper rear end of stabilizer arm 28. In other words, when control member 55 pivots clockwise, the moment arm of the turning moment supplied by chain 71 rapidly approaches zero. Thus, while the force exerted by chain 71 on the control member 55 remains constant, the turning moment exerted on control member 55 by chain 71 rapidly decreases as the control member pivots upwardly about bolt 50. The relative locations of connection member 70 and pivot pin 60 are such that the moment arm of the counter clockwise moment exerted on control member 55 by linkage 68 decreases at a much slower rate than the moment arm of the clockwise moment exerted on control member 55 by chain 71 when the control member swings upwardly. The moments exerted on control member 55 by chain 71 and linkage 68 balance each other when the cutter bar reaches the gagged position shown in phantom lines in FIG. 2. Thereafter, any further pivoting of control member 55 would decrease the chain exerted moment below that of the linkage exerted moment; thus, no further pivoting of control member 55 occurs and the cutter bar 46 holds the gagged position. Since continued application of force occurs through chain 71 as the stabilizer arm 28 continues upwardly, the entire drag bar begins to swing upwardly about pintle 31. With the upper stabilizer arm 28 properly adjusted for the length of the drawbars employed and the extent of vertical swinging movement afforded by the tractor hydraulic system, the drag bar 32 reaches its horizontal transport position when the drawbars 11 and 12 have been raised to the upper limit of their available swinging movement. No physical stops or stress producing joint binding occurs in the cutter bar-drag bar assembly at any time.

As in other mowers, the cutter bar of the present mower is intended to be pivoted upwardly beyond the vertical for long distance travel or road transport. As in conventional mowers, movement of the cutter bar to the road transport position is manually performed. In FIGS. 1 and 2, a cutter bar road transport holder 80 may be seen fixedly carried at the upper end of spring stanchion 62. The cutter bar is shown in road transport position in phantom lines in FIG. 2 in connection with the holder 80. When the cutter bar is in the road transport position, the drag bar 32 remains in its previously mentioned horizontal transport, or inoperative, position. The member of linkage 68 which engages pivot pin 60 is in the form of a strap which passes around the pivot pin 60, as is clearly illustrated in FIG. 2. It will be apparent that this construction of the linkage 68 is such that manual raising of the cutter bar beyond the gagged position is readily accomplished.

Having thus described our invention, what we claim is:

1. In a mower having a base frame, a drag bar, and a cutter bar wherein said cutter bar is mounted on one end of said drag bar for vertical swinging movement relative thereto between a generally horizontal operative position and an upwardly inclined gagged position and wherein the other end of said drag bar is pivotally mounted on said base frame for vertical swinging movement relative thereto between a lowered operative position and a raised inoperative position, improved drag bar supporting and cutter bar gagging mechanism comprising a pivot member fixedly mounted on said drag bar, a control member journalled on said pivot member for free pivotal movement about the axis thereof through a predetermined arcuate distance, force transmitting means extending between said control member and said cutter bar, means connecting said force transmitting means to said control members, said connecting means being located relative to said pivot member so that said cutter bar supporting force acting through the force transmitting means and the connecting means exerts a first turning movement in one direction on the control member, a spring operatively interconnected between said control member and said base frame exerting a second turning movement in an opposite direction about said pivot member counter-balancing the first turning movement of said cutter bar supporting force, an actuating member operatively connected to said control member for pivoting the control member about said pivot member between a first position wherein said spring and force transmitting means exert counter-balancing movements on said control member to floatingly support said cutter bar in said operative position relative to said drag bar and a second position wherein said actuating member and said force transmitting means exert counter-balancing movements on said control member and support said cutter bar in said gagged position whereby the force of said spring acting through said mounting means floatingly supports said drag bar in its said operative position when said control member is in its said first position and said actuating member exerts a lifting force on said drag bar when said control member has pivoted to its said second position, said first and second positions of said control member lying within the arcuate distance of free movement afforded by the pivotal mounting of said control member.

2. In a mower having a base frame, a drag bar, and a cutter bar wherein said cutter bar is mounted on one end of said drag bar for vertical swinging movement relative thereto between a generally horizontal operative position and an upwardly inclined gagged position and wherein the other end of said drag bar is pivotally mounted on said base frame for vertical swinging movement relative thereto between a lowered operative position and a raised inoperative position, improved drag bar supporting and cutter bar gagging mechanism comprising a pivot member fixedly mounted on said drag bar, a control member journalled on said pivot member for free pivotal movement through a predetermined angular range about the axis of said pivot member, said control member having first and second angularly spaced operating positions both of which lie within said range of free pivotal movement of said control member, a spring operatively interconnected between said base frame and said control member for floatingly supporting said drag bar in its said operative position, said spring being connected to said control member at a point spaced from said pivot member whereby the force of said spring exerts a turning moment on said control member about the axis of said pivot member, linkage interconnected between said cutter bar and said control member to support said cutter bar in said operative position when said control member is in said first position and to support said cutter bar in said gagged position when said control member is in said second position, said linkage being connected to said control member at a point spaced from said pivot member whereby the weight of said cutter bar acting through said linkage exerts a turning moment on said control member about the axis of said pivot member, said points on said control member being so relatively located that the moments of said spring and said linkage on said control member counter-balance when said control member is in said first position to floatingly support said cutter bar in its said operative position, and a flexible member selectively operable to exert an upward swinging force on said drag bar relative to its pivotally mounted end to swing the drag bar from its said operative position to its said inoperative position, said flexible member being operatively connected between said base frame and a point on said control member spaced from said pivot member whereby the force exerted by said flexible member appiles a turning moment to said control member and pivots the control member to its said second position thereby moving said cutter bar to its gagged position, said points of connection of said flexible member and said linkage being so relatively located on said control member that the turning moments of said linkage and said flexible member on said control member counter-balance when said control member has pivoted to said second position whereupon said control member ceases to pivot about said pivot member without engagement therewith by any other movement limiting stop means and said drag bar swings upwardly about its pivoted end.

3. Mower drag bar supporting and cutter bar gagging mechanism as recited in claim 2 wherein a stanchion is fixedly mounted on said drag bar and extends upwardly therefrom between the ends of the drag bar, said pivot member being carried by said stanchion adjacent the upper end thereof and having a horizontal pivot axis, said control member comprising a plate journalled on said pivot member for swinging movement in a vertical plane, said linkage being pivotally connected to said plate at a point spaced below said pivot member, said spring being pivotally connected to said plate at a point spaced substantially at a right angle from said linkage connection point relative to the axis of said pivot member, and said flexible member being connected to said plate at a point located angularly between said other connection points.

4. Mower drag bar supporting and cutter bar gagging mechanism as recited in claim 2 wherein said base frame is adapted to be mounted on a tractor for vertical swinging movement relative to the tractor and comprises at least a pair of members which move relative to each other in response to vertical swinging movement of the base frame relative to the tractor, said drag bar being pivotally carried by one member of said pair of members, and said flexible member being interconnected between another member of said pair of members and said control member.

References Cited
UNITED STATES PATENTS

| | | | |
|---|---|---|---|
| 942,075 | 12/1909 | Jewell | 56—278 |
| 2,787,879 | 4/1957 | Johnson | 56—25 |
| 2,884,752 | 5/1959 | Martin | 56—25 |
| 2,895,277 | 7/1959 | Scarnato et al. | 56—25 |

LUCIE H. LAUDENSLAGER, *Primary Examiner.*

U.S. Cl. X.R.

56—278